United States Patent
Kamath et al.

(10) Patent No.: US 9,436,414 B2
(45) Date of Patent: Sep. 6, 2016

(54) MANAGING A PRINTING DEVICE BEHIND A FIREWALL

(75) Inventors: Harish B Kamath, Bengalooru Karanataka (IN); Hean Koon Koay, Singapore (SG); Pai K Atul, Bangalore Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 1707 days.

(21) Appl. No.: 12/776,372

(22) Filed: May 8, 2010

(65) Prior Publication Data
US 2011/0276986 A1    Nov. 10, 2011

(51) Int. Cl.
H04L 29/06 (2006.01)
G06F 3/12 (2006.01)
G06F 21/60 (2013.01)

(52) U.S. Cl.
CPC ........... *G06F 3/1203* (2013.01); *G06F 3/1231* (2013.01); *G06F 3/1287* (2013.01); *G06F 21/608* (2013.01); *H04L 63/029* (2013.01)

(58) Field of Classification Search
USPC ................................................. 709/223, 203
See application file for complete search history.

(56) References Cited

U.S. PATENT DOCUMENTS

| 6,978,299 B1 * | 12/2005 | Lodwick | G06F 3/1203 358/1.14 |
| 7,365,872 B2 | 4/2008 | Lawrence et al. | |
| 8,010,469 B2 * | 8/2011 | Kapoor | G06F 9/505 706/20 |
| 8,045,485 B2 * | 10/2011 | Shima | H04L 43/0817 370/255 |
| 2007/0050373 A1 * | 3/2007 | Ahmed et al. | 707/10 |
| 2007/0127069 A1 | 6/2007 | Steele et al. | |
| 2008/0180712 A1 | 7/2008 | Selvaraj | |
| 2009/0168100 A1 | 7/2009 | Huster | |
| 2009/0174894 A1 | 7/2009 | Kamijo | |
| 2012/0131326 A1 * | 5/2012 | Lau | H04L 63/104 713/150 |

FOREIGN PATENT DOCUMENTS

WO    2009120154 A2    10/2009

OTHER PUBLICATIONS

Blackerry Rocks—"HP and RIM Announce Strategic Alliance to Mobilize Business on BlackBerry"—May 4, 2009—http://blackberryrocks.com/2009/05/04/hp-rim-announce-strategic-alliance-mobilize-business-blackberry/[retrieved on Jun. 7, 2010 4:39:38 PM]—pp. 1-4.
If It Prints, I'll Let You Know—Print Anywhere From Your BlackBerry Through HP CloudPrint—http://printerinkcartridgesblog.printcountry.com/?p=2219[retrieved on Jun. 7, 2010 4:47:57 PM]—pp. 1-4.
Letstalk.com/Phone Talk—Is HPs Cloud Print the future of printing on-the-go?—May 6, 2009—http://www.letstalk.com/blog/post.htm?blogId=989[retrieve on Jun. 7, 2010 4:36:35 PM]—pp. 1-3.
HP and Blackberry—"Weaving mobility into the fabric of enterprises"—WES2009—May 6, 2009—p. 1.
HP and RIM—"Increasing the value of Enterprise Software for mobile employees" May 6, 2009—pp. 1-32.

* cited by examiner

*Primary Examiner* — Asghar Bilgrami
(74) *Attorney, Agent, or Firm* — HP Inc Patent Department

(57) ABSTRACT

One embodiment is method that receives, at a computer, a request to manage a printing device located behind a firewall that blocks the request. The request is executed with an agent authorized to communicate through the firewall and with the computer and the printing device.

20 Claims, 7 Drawing Sheets

MANAGING A PRINTING DEVICE BEHIND A FIREWALL

BACKGROUND

Printing across a network is complicated since firewalls can restrict or prevent a user from accessing a printer. Firewalls can also prevent monitoring print status and controlling the printer across the network.

DETAILED DESCRIPTION

Figure 1:
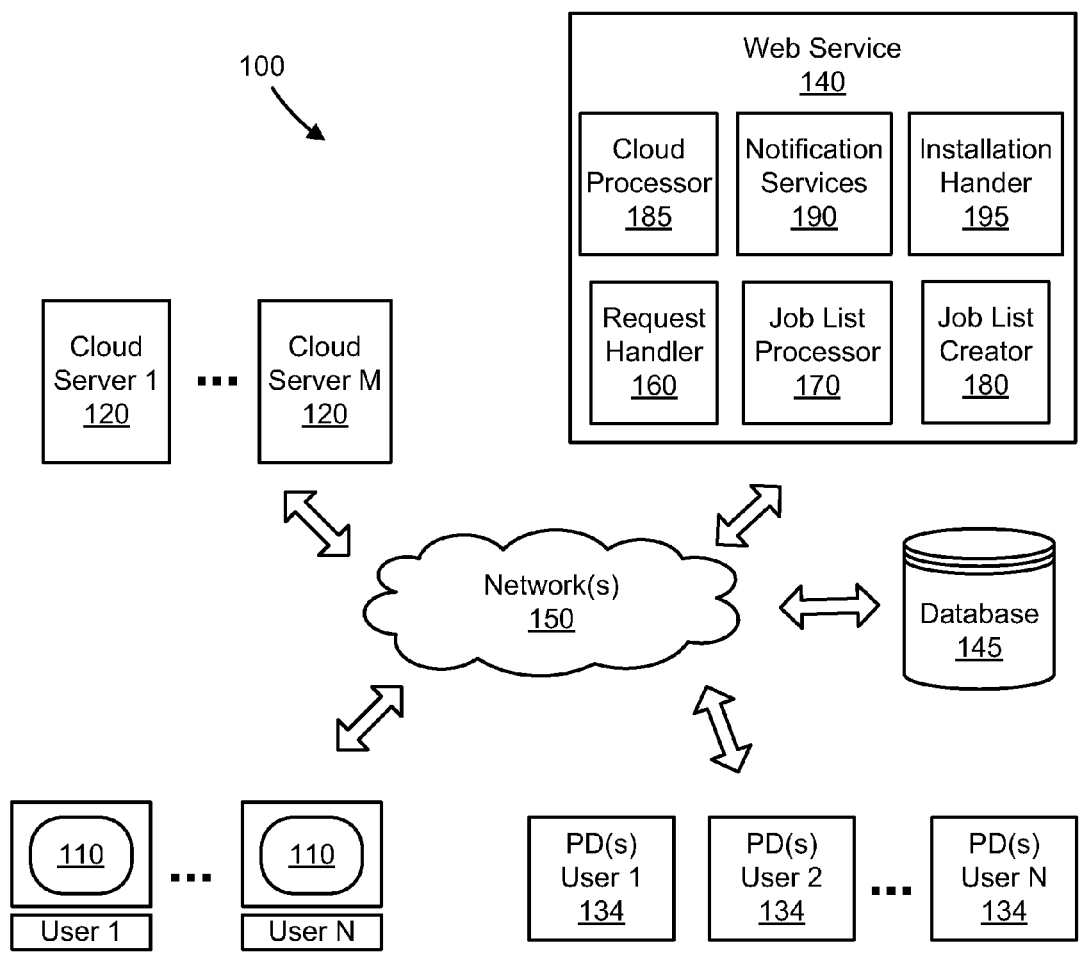
FIG. 1 shows a cloud print system in accordance with an example embodiment.

Example embodiments are systems, methods, and apparatus that monitor and manage a cloud printing device over the internet through a firewall. The cloud printing device is monitored and controlled with one or more agents and REST API (representational state transfer application program interface) calls. Functions of the printing device are managed through a web browser interface on a mobile handheld device that communicates with the printing device through a cloud.

In one embodiment, a user manages the printing device during a print operation or during non-printing times for a specific device management operation. By way of example, a portable or handheld electronic device of the user can communicate with the printing device in real-time (i.e., as an event occurs) and determine the status of different operations at the printing device or manage control functions of the printing device. Management of the printing device occurs regardless of whether the printing device is located behind a firewall since communication with the printing device occurs through an agent using REST API calls. The services for monitoring and managing the operations and control functions of the printing devices are exposed as REST API and accessible through internet protocols, technologies such as HTTP (hypertext markup language) and XML (extensible markup language).

A cloud server or internet print service and agent enable a user with an electronic device to manage printing/copying/scanning services of the printing device. For example, one or more agents determine a status of each printing device registered with the cloud and then post this status information to a cloud web server. The printing device is located behind a firewall which blocks incoming communications (e.g., communications originating with the electronic device of the user). The agent, however, is located within the firewall or authorized to communicate with the printing device. When a user logs into the cloud, this status information is provided from the agent to the electronic device of the user. In this manner, the user is able to receive status information through a firewall which otherwise prohibits an electronic device from making requests directly to the printer since the firewall blocks such requests.

In one embodiment, an agent of the printing device periodically communicates or reports a status of the printing device using REST API. Agent software is embedded inside the printing device as a firmware component or is exposed as an agent running on a computer or server in the cloud or computer network. In one embodiment, the agent functions as a bridge between the internet print service or cloud server (which operates outside of the firewall) and the printing device (which operates inside the firewall). As explained below, the agent gathers printer information and transmits or posts this information to a logical or virtual device which, in turn, provides the information to an electronic device outside of the firewall where the printing device is located.

The cloud server or electronic device of the user is not able to make requests directly to the printing device since the printing device is located inside a firewall. Instead, communication between the printing device and the user's electronic device initiates from the agent. The electronic device is able to communicate indirectly with the printing device through the agent. For example, the user on an electronic device transmits a request to change or monitor a function or parameter of the printing device. This request is stored in the virtual device in the cloud and not sent directly to the printing device since the firewall would block the request. Subsequently, the agent for the printing device periodically polls or communicates with the virtual device and/or cloud server to determine if any requests are pending for execution by the agent. For example, the agent polls the cloud server or virtual device at regular intervals (such as the agent polling the device every 15 seconds or less). The virtual device notifies the agent of the request when the agent initiates a communication or the agent discovers this request at the virtual device and then acts upon the request (e.g., retrieves the requested information or performs the requested function). The agents are able to listen for GET requests from the user and/or actively post information (i.e., non-requested information) to the virtual device. GET requests retrieve information identified in the request.

A status of the printing device (such as busy, out of paper, toner low, etc.) is propagated by the agent to the internet print service or cloud server using a REST API call. The status information is persisted in the abstracted printer device on the cloud server or web-server. A user of an electronic device can view this status information using corresponding REST API calls or any such interface provided by an application. The user and electronic device can also manage or change control functions (such as operating parameters) of the printing device using REST API calls in conjunction with one or more agents that are able to communicate inside the firewall and with the printing device.

With example embodiments, control of the printing device occurs through two separate cases: (1) installing a hardware component inside the printing device, or (2) enabling/disabling components of printing device.

Regarding the first case (i.e., installing a hardware component inside the printing device), a user installs a duplexing unit in a printing device. The printer agent propagates configuration changes to the internet print service or cloud server and such changes are reflected in the print/copy/scan capabilities of the printing device. The information is further applied to the jobs destined to this printing device.

Regarding the second case (i.e., enabling/disabling components of printing device), a user desiring to cancel a print job currently in execution issues a REST API request to an abstracted device of the web-server or cloud server. The agent (such as a printer agent installed in the printing device) polls and acquires the user request through REST API calls and reacts to the users request.

As used herein and in the claims, "representational state transfer" or "REST" is software architecture for distributed hypermedia systems such as the internet and World Wide Web (web). In REST architectures, clients initiate requests to servers that process the requests and return responses. These requests and corresponding responses are built around the transfer of "representations" of "resources" such as a document that captures the current or intended state of a resource. The client is generally in a rest state or transitioning between different application states. While in the rest state, the client interacts with the device but creates no load and consumes no per-client storage on the set of servers or on the network. The client begins sending requests when it is ready to transition to a new state. While a request is outstanding, the client is in a transitioning state. The representation of each application state contains links that are used the next time the client chooses to initiate a new state transition.

REST architecture uses resources (i.e., sources of specific information) that are referenced with a global identifier, such as a uniform resource identifier (URI: string of characters that identify a resource on the internet) in hypertext transfer protocol (HTTP). To manage such resources, components on the network (e.g., agents and servers) communicate through a standardized interface (such as HTTP) and exchange representations of the resource. Devices on the network (servers, clients, tunnels, etc.) can make a request, and an application can communicate with a resource by knowing (1) the identifier of the resource and (2) the action of the resource. The application is not required to know whether devices exist between itself and the server or the device holding the information (i.e., the application does not need to know whether there are caches, proxies, gateways, firewalls, tunnels, etc. between it and the device storing the requested information). The application is able to understand the format of the information (representation) returned, which is typically an HTML document, extended markup language (XML) document, an image, plain text, or any other content.

As used herein and in the claims, "application program interface" or "API" is an interface that a software program uses to enable other software to communicate with the software program. Applications use API to define how other software programs can make calls to and request services from the application.

In one example embodiment, the API is language independent and can be called from different programming languages. In other words, the API is not bound to a given process or system and can be provided as remote procedure calls and web services.

In one embodiment, the API is defined as a set of HTTP request messages along with a definition of the structure of response messages, such as being expressed in XML.

In one embodiment, REST web service or REST web API is a web service that uses HTTP and principles of REST. By way of example, such a web service is a collection of resources that include the base URI for the web service, the type of data supported by the web service (such as XML or other MIME type), and the operation supported by the web service using HTTP methods (such as POST, GET, PUT, DELETE, etc.).

With example embodiments, a user can print/copy/scan to the printing device from a remote electronic device. Users are able to print emails, documents, photos, web pages, etc. from a variety of different portable devices running different operating systems. Mobile users can print/copy/scan to one or more printing devices from any worldwide location that provides internet access, regardless of whether the user is located at home, in the office, on the road, in a foreign country, etc. and regardless of whether the printing device is located within or behind a firewall.

FIG. 1 shows a cloud print system 100 in accordance with an example embodiment of the present invention. The system includes a plurality of users or computers 110 (shown as user 1 to user N), a plurality of cloud servers 120 (shown as cloud server 1 to cloud server M), a plurality of printing devices (PD) 134 for the users, a web service 140, and a database 145 in communication with each other through one or more networks 150 (such as the internet and world wide web or web). The web service 140 further includes a request handler 160, job list processor 170, job list creator 180, cloud processor 185, notification services 190, and installation handler 195. The cloud processor 185 performs processing functions for the cloud, and the notification services 190 notifies a user, computer, or administrator of job status, such as print job complete, printing error, etc. The installation handler 195 communicates with the printing devices 134 to install the printing devices, as discussed herein with example embodiments.

The cloud print system provides printing services to users who connect to the cloud through the internet. Users are able to print/copy/scan to their printing devices from different geographical locations around the world upon installing a printing device and establishing ownership or user rights with the printing device.

Generally, a print job work item is performed with the following operations: handling user requests, creating a job list, and processing the job list. The print job request handler 160 acts on user requests. The job list creator 180 creates job steps, and the job list processor 170 executes the job steps according to the assigned priorities. These tasks are more fully discussed in U.S. patent application having Ser. No. 12/544,223 entitled "Web Printing" which was filed 20 Aug. 2009 and incorporated herein by reference.

Figure 2:
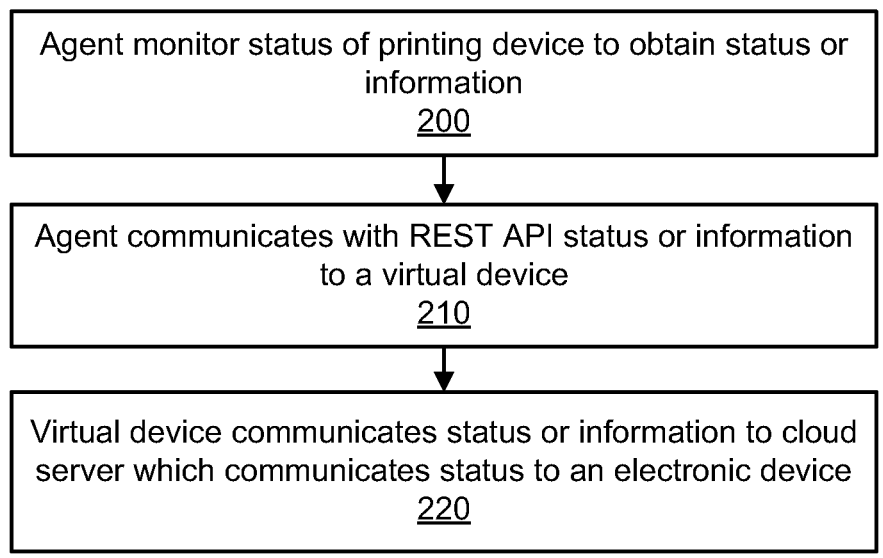
FIG. 2 shows a flow diagram for an agent monitoring and posting the status of a cloud printing device in accordance with an example embodiment.

FIG. 2 shows a flow diagram for an agent monitoring and posting the status of a cloud printing device in accordance with an example embodiment. FIG. 2 provides an example method of providing an electronic device located outside of a firewall with information about a printing device located inside a firewall. The electronic device is not able to directly communicate with the printing device since the firewall blocks transmissions or requests from the electronic device to the printing device. As such, the electronic device is not able to initiate a status request to the printing device, but instead receives this information through an agent. FIG. 2 is discussed in connection with FIG. 4.

Figure 4:
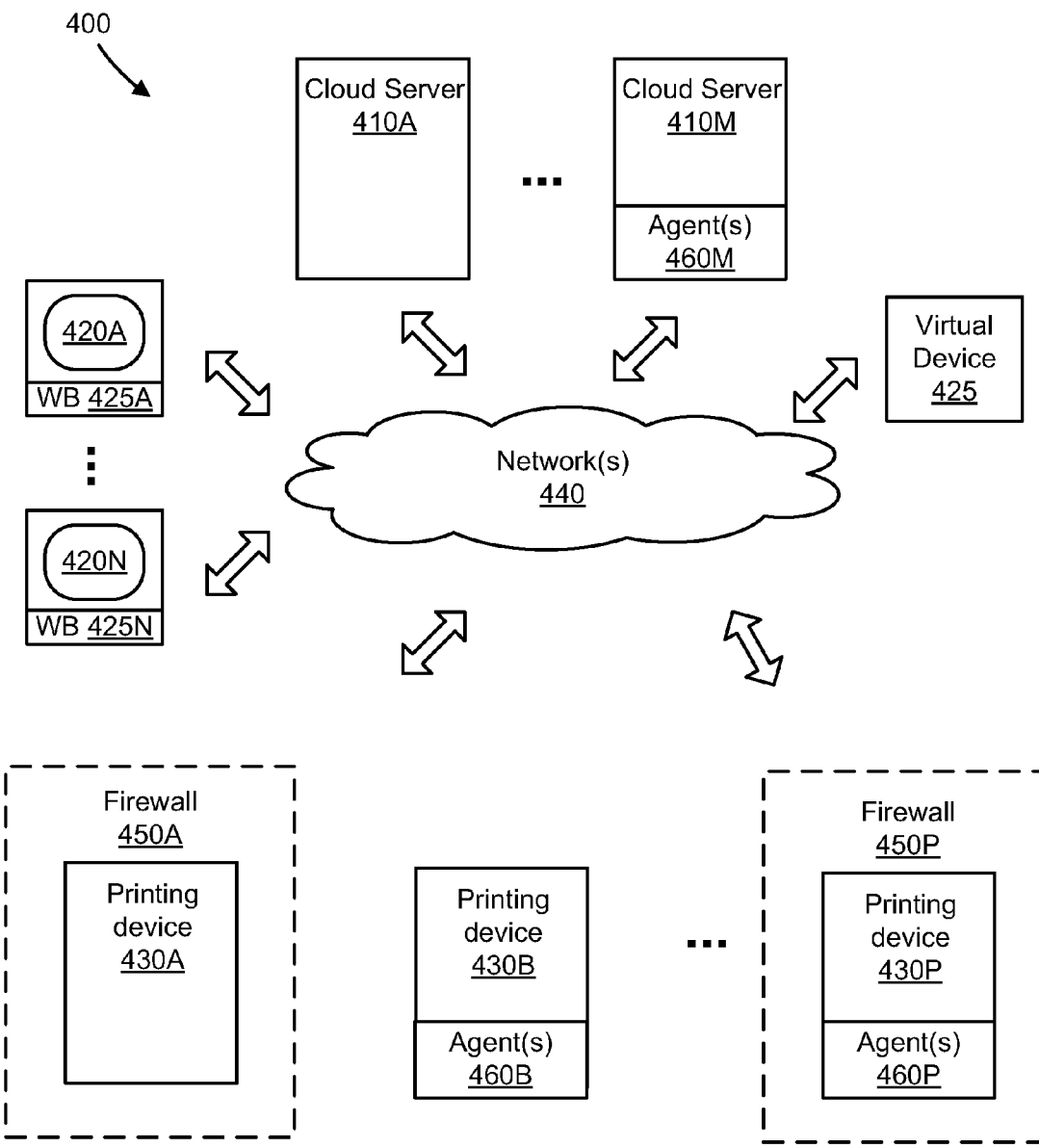
FIG. 4 shows a diagram of remote electronic devices monitoring and managing cloud printing devices with agents through firewalls in accordance with an example embodiment.

FIG. 4 shows a computer or communication system 400 (such as part of a cloud print system shown in FIG. 1) having a logical or virtual device 425 and a plurality of cloud servers 410A to 410M that communicate with a plurality of remote electronic devices 420A to 420N and printing devices 430A, 430B to 430P through one or more networks 440 (such as the internet, web, intranet, extranet, etc.). Each electronic device has a web browser (WB), shown as 425A to 425N. The virtual device 425 can be a separate computing device or located in one or more of the cloud servers.

Some of the printing devices are located behind or within one or more firewalls. For example, printing device 430A is located behind firewall 450A, and printing device 430P is located behind firewall 450P. Printing device 430B is not located behind a firewall.

As used herein and in the claims, a "firewall" is part of a computer system or network that is designated to block unauthorized access while permitting authorized communications. For example, firewalls (which can be implemented in hardware and/or software) prevent unauthorized network users (such as internet users) from accessing private networks or private devices connected to the network (such as printing devices connected to cloud servers). All messages entering or leaving pass through the firewall, which examines each message and blocks those messages that do not meet a specified security criteria.

According to block 200, an agent monitors the status of a cloud printing device to obtain status or information. The agent can be embedded in the cloud server, the printing device, or located in another location in the computer system 400. For example, cloud server 410M includes one or more agents 460M; printing device 430B (not within a firewall) includes one or more agents 460B; and printing device 430P (within a firewall 450P) includes one or more agents 460P.

As used herein and in the claims, an "agent" is a software program that acts or functions for a user, electronic device, or other program in order to accomplish a task and/or perform a designated function.

Figure 3:
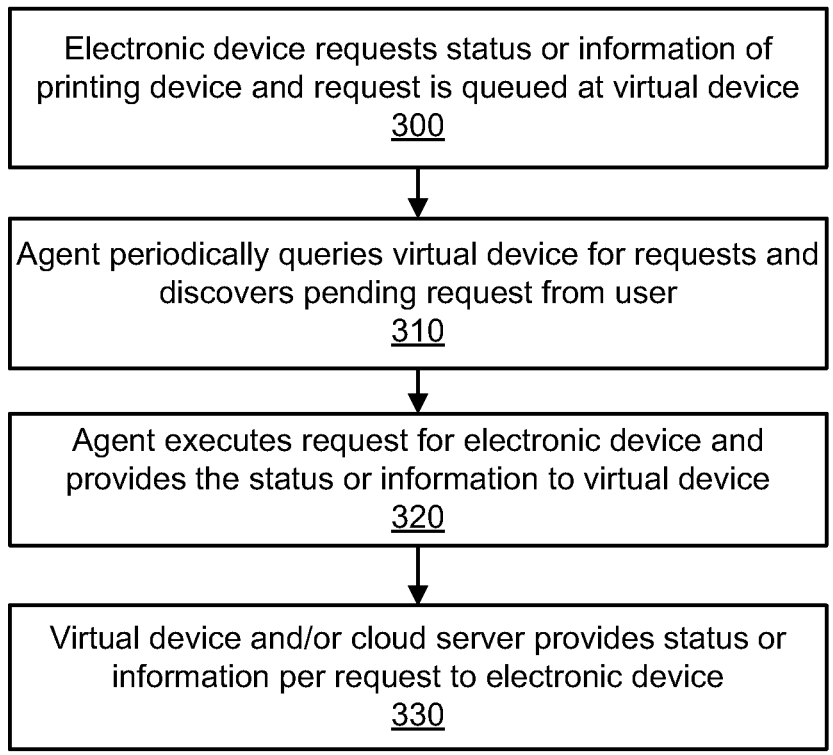
FIG. 3 shows a flow diagram for an agent executing requests for status of a cloud printing device in accordance with an example embodiment.

The agents (shown generally at 460) include one or more of POST agents and GET agents that are authorized to pass through the firewall. A POST agent passes through the firewall and automatically posts information to the logical or virtual device 425 without receiving a request for such information (e.g., the POST agent posts paper tray out of paper, printing device has paper jam, printing device is busy processing a print/copy/scan request, etc.). FIG. 2 is an example method executed by a POST agent. By contrast, GET agents actively retrieve information from the printing device upon receiving a request for the information (e.g., a user utilizes a GET agent to manage a control function or change a printing parameter of the printing device). FIG. 3 is an example method executed by a GET agent.

By using agents, a remote electronic device located outside of the firewall can manage, obtain, or observe operational status, information, or parameters of the printing device that include, but are not limited to, determine status of a current print/copy/scan job (e.g., pending in a queue, currently executing, print/copy/scan complete, etc.), determine health of the printing device (e.g., online and ready for print/copy/scan, offline, error, jam, etc.), determine general status of a parameter or control function (e.g., list print/copy/scan jobs in queue, determine estimated time to complete print/copy/scan, determine level of ink or paper quantity available for printing), etc. Further examples of such parameters include, but are not limited to, characteristics desired by the user, such as printing with a certain color, level of security, geographical location, print quality, time frame to complete print job, number of copies, single or double-sided printing, scaling to paper size, selected pages to print, orientation, selection of font, location to store the document (e.g., store on cloud server), etc. Such functions may require remote operations that are supported apart from controls physically located on the console of the printing device. The user or electronic device is able to view, manage, and change such control functions.

According to block 210, the agent communicates through a firewall with REST API the status or information of the printing device to the logical or virtual device located outside of a firewall in which the printing device is located. For example, a POST agent 460B, 460P, or 460M posts status or information to virtual device 425.

According to block 220, the virtual device communicates the status or information to a cloud server which communicates the status to an electronic device. The logical or virtual device can store the status information (e.g., until a subsequent request is made for the information or while the user is offline) and/or forward the status information to the cloud server. For example, when a user of electronic device 420A logs onto the cloud server 410A, the status information stored in virtual device 425 is provided to the user (such as information informing the user that the printer is out of paper, is busy, has a paper jam, has low toner, etc.). The printing device can be shared among multiple users. While a first user is printing to the device, one or more additional users are notified that the printing device is temporarily busy.

FIG. 3 shows a flow diagram for an agent executing requests for a status or management of parameters of a cloud printing device in accordance with an example embodiment.

According to block 300, an electronic device requests status or information of a printing device, and the request is queued at a virtual device. For example, electronic device 420A requests information about printing device 430P. This request is stored or queued at virtual device 425. The request is not transmitted to the printing device 430P since firewall 450P would block such a transmission. As explained above, the request can be a query and/or change or alter a parameter or function of the printing device or manage, obtain, or observe operational status, information, or parameters of the printing device.

According to block 310, the agent periodically queries or polls the virtual device for requests and discovers the pending request from the user electronic device.

According to block 320, the agent executes the request for the electronic device and provides the status or information to the virtual device.

With example embodiments, the electronic device can manage and change various control functions and/or operation parameters of the printing device with the agent authorized to pass through the firewall and execute requests. These control functions include, but are not limited to, cancelling or restarting a print/copy/scan job on the printing device, enabling or disabling or change print/copy/scan features of the printing device (e.g., change between portrait and landscape printing, changing between one or two-sided printing, changing a number of copies to print/copy/scan, changing image or resolution quality of print/copy/scan, changing between color or black and white print/copy/scan, reorganizing or re-prioritizing print jobs in queue, etc.).

According to block 330, the virtual device and/or cloud server notifies and provides the status or information per the request to the electronic device.

For example, electronic device 420A transmits a request to change a printing parameter of printing device 430P (e.g., change default tray from tray 1 to tray 2). The request is transmitted from a web browser 425A of electronic device 420A, through the internet 440, to cloud server 410A which, in turn, transmits the request to the virtual device 425. The GET agent 460B, 460P, or 460M polls the virtual device 425 and discovers the pending request. The agent then executes the request at the printing device and transmits a message to the virtual device 425 stating that the request was successfully executed. The virtual device 425 and/or cloud server 410A then transmits the message to the electronic device 420A, which can display the status information to the user. Communication between the agent and the virtual device and/or cloud server occurs using REST API.

Figure 5:
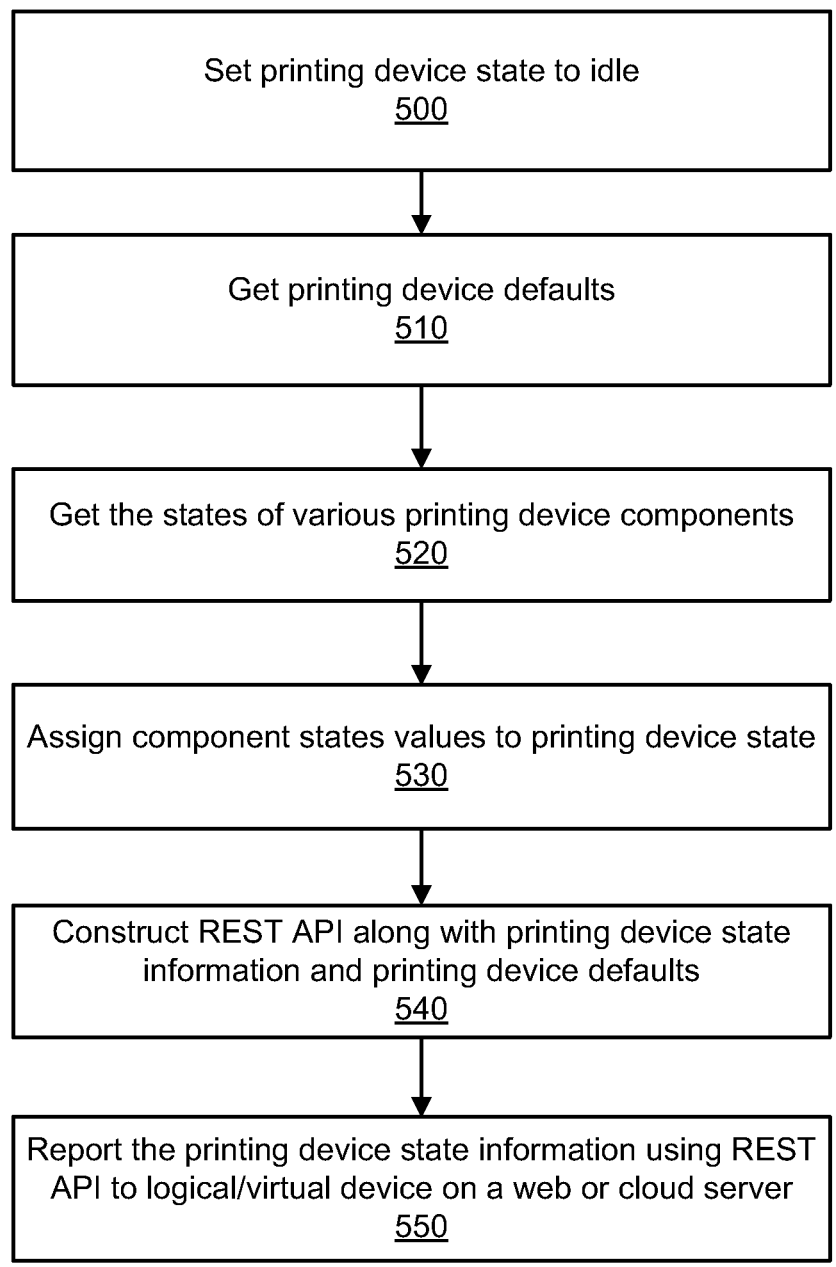
FIG. 5 shows a flow diagram for an agent reporting states of a printing device using REST API in accordance with an example embodiment.

FIG. 5 shows a flow diagram for an agent reporting states of a printing device using REST API in accordance with an example embodiment.

According to block 500, the state of the printing device is set to idle. Then, the printing device defaults are obtained (e.g., in bitmap format) according to block 510. According to block 520, the states of the various printing device components are obtained (e.g., toner level, tray indicator, paper jam, job processing, etc.). The component state values are assigned to the printing device (e.g., as a bitmap) according to block 530. REST API is constructed along with printing device state information and printing device defaults according to block 540. The printing device state information is reported using REST API to a logical or virtual device on a web or cloud server according to block 550. Blocks 500 through 540 can be executed periodically or on a change of event.

Figure 6:
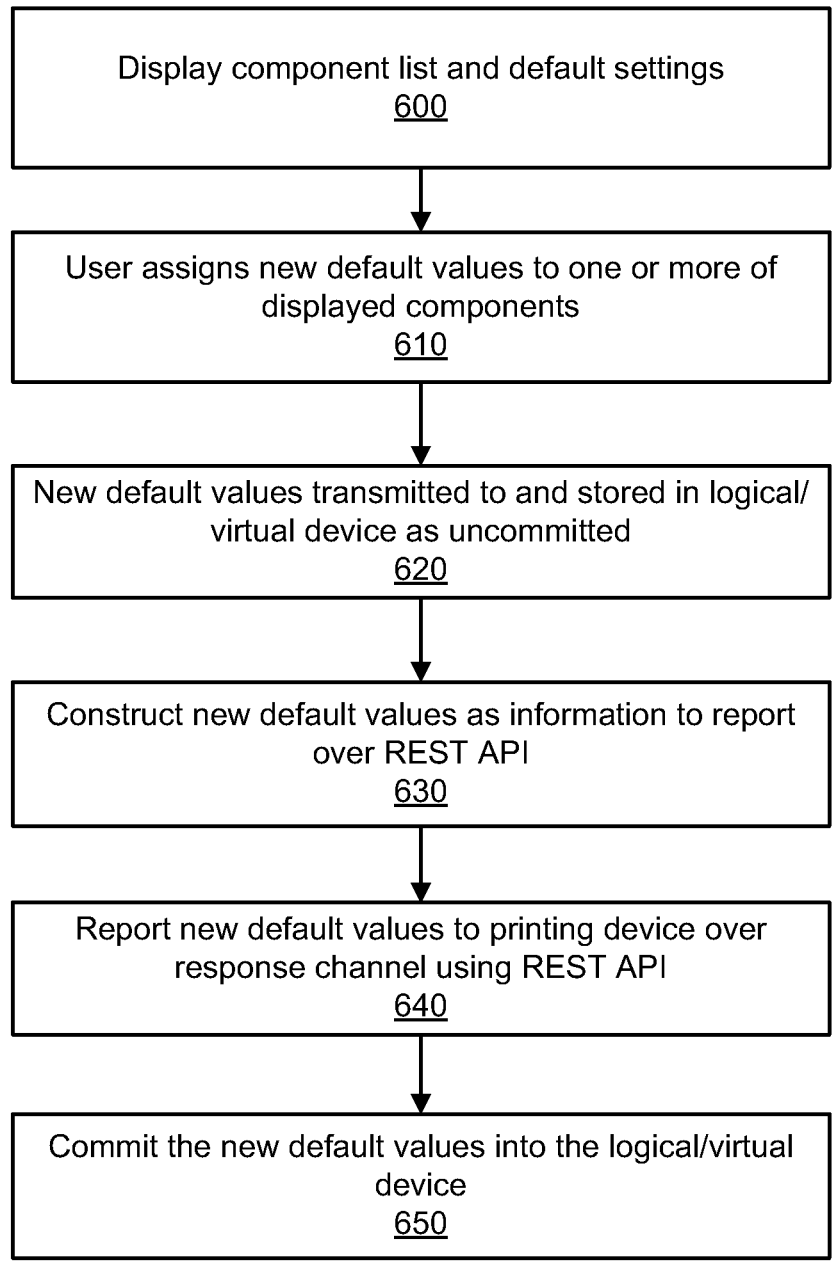
FIG. 6 shows a flow diagram for a user using an agent to change printing parameters of a printing device using REST API in accordance with an example embodiment.

FIG. 6 shows a flow diagram for a user using an agent to change printing parameters of a printing device using REST API in accordance with an example embodiment.

According to block 600, the component list and defaults settings are displayed (e.g., displayed to a user on a remote electronic device settings of the printing device such as color or black and white, default paper tray, paper size, one or two-side printing, etc.). The user then assigns new default values to one or more of these components according to block 610. These new default values are transmitted to and stored as uncommitted in a logical or virtual device according to block 620. The new default values are constructed as information to report over REST API according to block 630, and then reported to the printing device over a response channel using REST API according to block 640. The new default values are committed into the logical or virtual device according to block 650.

Figure 7:
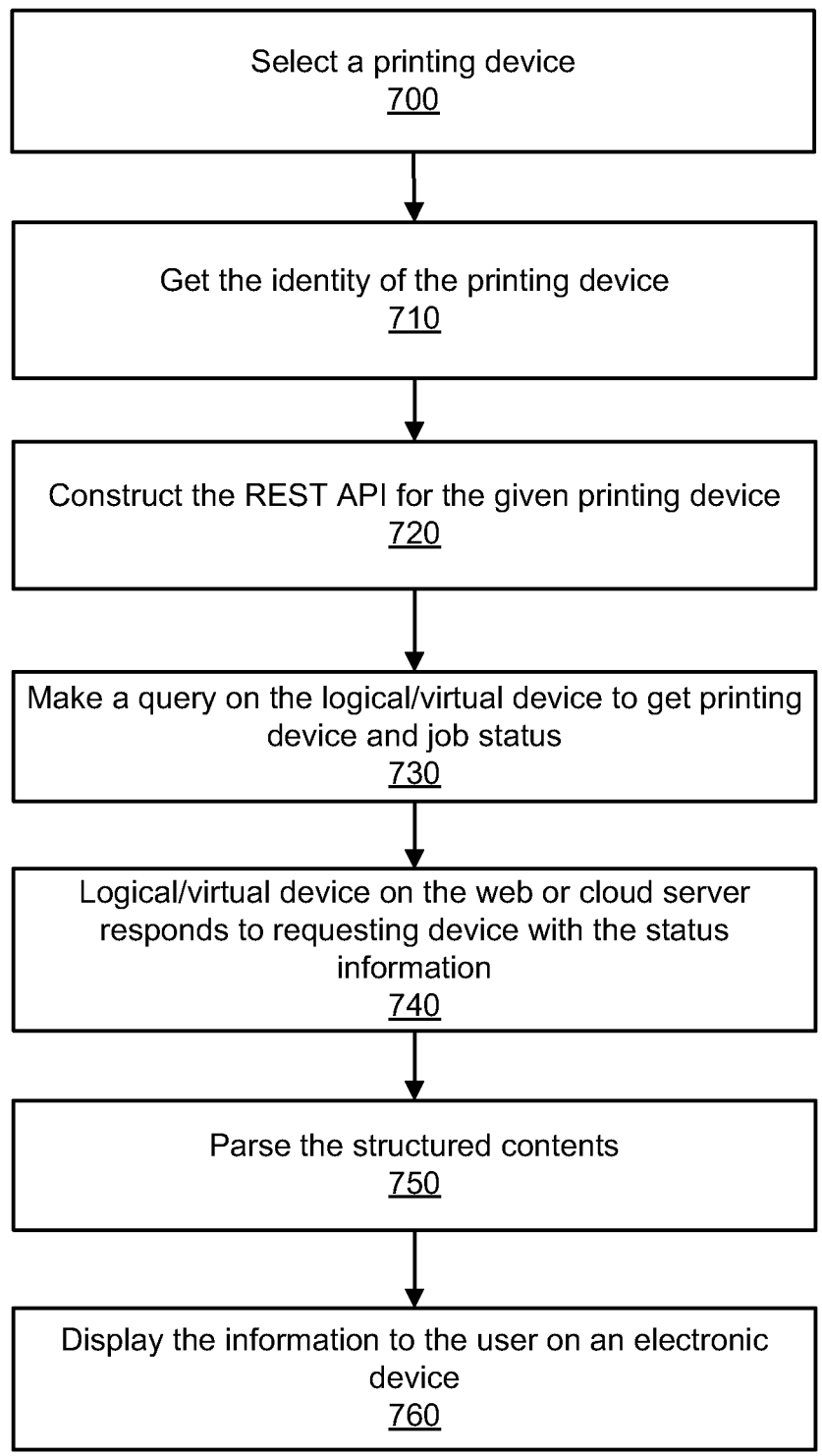
FIG. 7 shows a flow diagram for a user using an agent to monitor a status of a printing device using REST API in accordance with an example embodiment.

FIG. 7 shows a flow diagram for a user using an agent to monitor a status of a printing device using REST API in accordance with an example embodiment.

According to block 700, a printing device is selected (e.g., a user selects a printing device for which the user is authorized to use). According to block 710, an identity of the printing device is obtained. Next, REST API is constructed for the selected printing device according to block 720. A query is then made on the logical or virtual device to get printing device and job status according to block 730. The logical or virtual device on the web or cloud server responds to the requesting electronic device with the status information according to block 740. The structured contents are parsed according to block 750, and the information is displayed to the user on the electronic device according to block 760.

Figure 8:
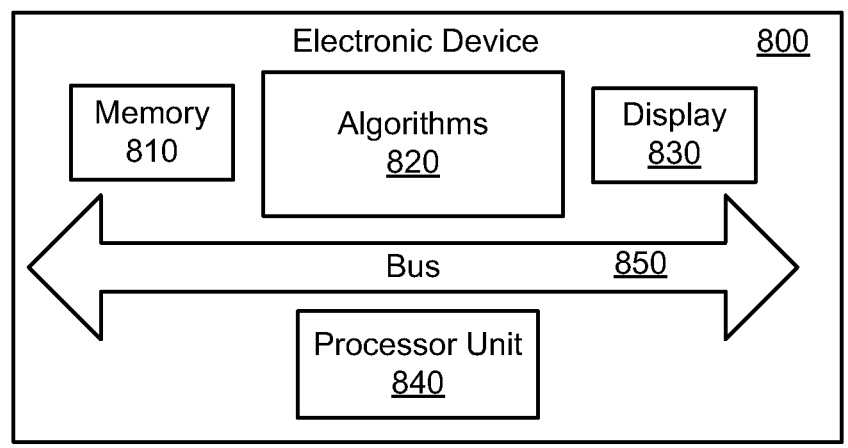
FIG. 8 is a computer system in a cloud print system in accordance with an example embodiment.

FIG. 8 is a block diagram of an electronic device 800 in a cloud print system in accordance with an example embodiment. The electronic device 800 includes memory 810, algorithms 820, display 830, processing unit 840, and one or more buses 850. The processor unit includes a processor (such as a central processing unit, CPU, microprocessor, application-specific integrated circuit (ASIC), etc.) for controlling the overall operation of memory 810 (such as random access memory (RAM) for temporary data storage, read only memory (ROM) for permanent data storage, and firmware). The processing unit 840 communicates with memory 810 and algorithms 820 via one or more buses 850 and performs operations and tasks that implement one or more blocks of the flow diagrams discussed herein. The memory 810, for example, stores applications, data, programs, algorithms (including software to implement or assist in implementing embodiments in accordance with the present invention) and other data.

As used herein and in the claims, the following words are defined as follows:

The term "cloud" is a computer network accessible over the internet and/or web that is dynamically scalable with virtualized resources, such as printing resources. Users are not required to have knowledge or expertise in the infrastructure of the cloud that relies on the internet to satisfy the computing or printing needs of users. The cloud provides computer and/or printing device services with business applications that are accessible from a web browser while software and data are stored on servers in the cloud. For example, a printing cloud system supports infrastructure for printing device services, platform for the printing device services, and software for the printing device services.

The term "printing device" is an electronic device that performs one or more functions of printing, scanning, and copying. In one embodiment, a printing device is a printer. A printing device, however, is not limited to printers, but includes other devices, such as a scanner, a copier, a machine with facsimile operations, and/or a multi-functional device that performs two or more functions of printing, scanning, copying, and faxing.

The term "print/copy/scan" is print and/or copy and/or scan.

The term "web-enabled" printing device is a printing device that is accessed to print/copy/scan documents over the web.

The term "world wide web" or "web" is a system of linked hypertext documents access through the internet. Using a web browser, a user can view web pages that include text, images, video, and other media and navigate between these pages with hyperlinks.

Example embodiments are discussed in connection with a printer. Example embodiments, however, are not limited to a printer but include various other types of electronic devices that perform one or more functions such as printing, scanning, or copying.

In one example embodiment, one or more blocks or steps discussed herein are automated. In other words, apparatus, systems, and methods occur automatically. The terms "automated" or "automatically" (and like variations thereof) mean controlled operation of an apparatus, system, and/or process using computers and/or mechanical/electrical devices without the necessity of human intervention, observation, effort and/or decision.

The methods in accordance with example embodiments of the present invention are provided as examples and should not be construed to limit other embodiments within the scope of the invention. Further, methods or steps discussed within different figures can be added to or exchanged with methods of steps in other figures. Further yet, specific numerical data values (such as specific quantities, numbers, categories, etc.) or other specific information should be interpreted as illustrative for discussing example embodiments. Such specific information is not provided to limit the invention.

In some example embodiments, the methods illustrated herein and data and instructions associated therewith are stored in respective storage devices, which are implemented as one or more computer-readable or computer-usable storage media or mediums. The storage media include different forms of memory including semiconductor memory devices such as DRAM, or SRAM, Erasable and Programmable Read-Only Memories (EPROMs), Electrically Erasable and Programmable Read-Only Memories (EEPROMs) and flash memories; magnetic disks such as fixed, floppy and removable disks; other magnetic media including tape; and optical media such as Compact Disks (CDs) or Digital Versatile Disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the various embodiments in accordance with the present invention, embodiments are implemented as a method, system, and/or apparatus. As one example, example embodiments and steps associated therewith are implemented as one or more computer software programs to implement the methods described herein. The software is implemented as one or more modules (also referred to as code subroutines, or "objects" in object-oriented programming). The location of the software will differ for the various alternative embodiments. The software programming code, for example, is accessed by a processor or processors of the computer or server from long-term storage media of some type, such as a CD-ROM drive or hard drive. The software programming code is embodied or stored on any of a variety of known physical and tangible media for use with a data processing system or in any memory device such as semiconductor, magnetic and optical devices, including a disk, hard drive, CD-ROM, ROM, etc. The code is distributed on such media, or is distributed to users from the memory or storage of one computer system over a network of some type to other computer systems for use by users of such other systems. Alternatively, the programming code is embodied in the memory and accessed by the processor using the bus. The techniques and methods for embodying software programming code in memory, on physical media, and/or distributing software code via networks are well known and will not be further discussed herein.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method executed by a computer in a network, comprising:
   receiving, at the computer and over the network, a request to manage a parameter of a printing device registered with the network and located behind a firewall that blocks the request; and
   executing the request to manage the parameter with an agent outside the firewall authorized to communicate with the computer, and authorized to communicate through the firewall with the printing device.

2. The method of claim 1 further comprising, communicating with the agent using REST API (representational state transfer application program interface) calls.

3. The method of claim 1 further comprising:
   storing the request at a virtual device located in the network and outside of the firewall;
   retrieving, with the agent, the request at the virtual device.

4. The method of claim 1 further comprising, periodically polling, by the agent, the computer for the request.

5. The method of claim 1 further comprising:
   receiving the request that is a change to a default value for the printing device;
   storing the change to the default value as being uncommitted in a logical device within the computer;
   reporting the change to the default value to the printing device over a response channel using REST API (representational state transfer application program interface);
   committing the change to the default value to the logical device after executing the change to the default value at the printing device.

6. The method of claim 1 further comprising:
   receiving the request over an internet from a remote handheld electronic device in communication with the computer;
   notifying the remote handheld electronic device after executing the parameter at the printing device.

7. The method of claim 1 further comprising, assigning component state values to the printing device from a remote portable electronic device located outside of the firewall.

8. A tangible non-transitory computer readable storage medium having instructions for causing a server in a network to execute a method, comprising:
   receiving, from an agent of a printing device, a post providing information about a status of the printing device that is registered with the network and located behind a firewall outside of the network;
   storing the information in a virtual device located in the server; and
   transmitting, over an internet, the information to an electronic device outside of the network and authorized to print to the printing device, the transmitting performed in response to the electronic device logging into the network.

9. The tangible computer readable storage medium of claim 8 further comprising, communicating with the printing device over a response channel using REST API (representational state transfer application program interface).

10. The tangible computer readable storage medium of claim 8, wherein the information is printing device defaults of the printing device and is received at the server in bitmap format.

11. The tangible computer readable storage medium of claim 8 further comprising,
   receiving, from the electronic device, a GET request requesting a status of a print job of the printing device;
   providing the GET request to a GET agent when the GET agent communicates with the network.

12. A computer, comprising:
   a memory storing an algorithm; and
   a processor connected to the memory to execute the algorithm that:
   receives, from an agent outside a firewall that prevents communication from the computer to the printing device, a post providing information about a printing device that is located behind the firewall, the agent authorized to communicate with the printing device through the firewall; and transmits, over a network, the information to an electronic device authorized to print to the printing device.

13. The computer of claim 12, wherein communication with the printing device occurs through the agent with REST API (representational state transfer application program interface) calls.

14. The computer of claim 12 further comprising, a virtual device that stores the information while the printing device is offline from the computer.

15. The computer of claim 12, wherein the agent is a POST agent that retrieves a state of the printing device and automatically posts the state to the computer.

16. The computer of claim 12, wherein the processor further executes the algorithm that reports the information to the electronic device when the electronic device logs in to the network.

17. The computer of claim 12, wherein the computer communicates with the printing device with both a GET agent and a POST agent.

18. The computer of claim 12 wherein the processor further executes the algorithm that:

receives, from the electronic device, a request to change a default printing parameter of the printing device;

provides the request to a GET agent when the GET agent initiates communication with the computer.

19. The computer of claim 12, wherein the firewall blocks transmissions originating from the computer and the electronic device, and the agent is authorized to communicate through the firewall and with the computer.

20. The method of claim 3, wherein the virtual device is a separate network element from the computer.

* * * * *

UNITED STATES PATENT AND TRADEMARK OFFICE
CERTIFICATE OF CORRECTION

PATENT NO. : 9,436,414 B2  
APPLICATION NO. : 12/776372  
DATED : September 6, 2016  
INVENTOR(S) : Harish B. Kamath et al.

Page 1 of 1

It is certified that error appears in the above-identified patent and that said Letters Patent is hereby corrected as shown below:

In sheet 1 of 7, reference numeral 195, Line 2, delete "Hander" and insert -- Handler --, therefor.

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*